United States Patent
Yamamoto

(10) Patent No.: US 8,495,222 B2
(45) Date of Patent: Jul. 23, 2013

(54) NETWORK SYSTEM, SERVER, CLIENT TERMINAL, TIMEOUT INFORMATION PROVIDING METHOD, TIMEOUT INFORMATION DISPLAY METHOD, AND PROGRAMS

(75) Inventor: Hiroshi Yamamoto, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 2761 days.

(21) Appl. No.: 10/282,421

(22) Filed: Oct. 29, 2002

(65) Prior Publication Data

US 2003/0088677 A1     May 8, 2003

(30) Foreign Application Priority Data

Nov. 5, 2001   (JP) .................................. 2001-339945

(51) Int. Cl.
*G06F 15/16* (2006.01)
(52) U.S. Cl.
USPC ........................................... 709/227; 709/228
(58) Field of Classification Search
USPC ................. 709/216, 217, 219, 227, 203, 228, 709/229
See application file for complete search history.

(56) References Cited

U.S. PATENT DOCUMENTS

| | | | |
|---|---|---|---|
| 5,937,159 A * | 8/1999 | Meyers et al. ................... | 726/20 |
| 6,073,119 A * | 6/2000 | Bornemisza-Wahr et al. . | 705/42 |
| 6,757,250 B1 * | 6/2004 | Fayad et al. ................. | 370/235.1 |
| 6,812,938 B2 * | 11/2004 | Pinnell .......................... | 715/741 |
| 6,826,775 B1 * | 11/2004 | Howe et al. ..................... | 725/40 |
| 7,353,229 B2 * | 4/2008 | Vilcauskas et al. ........... | 719/318 |
| 7,900,823 B1 * | 3/2011 | Knouff et al. ................. | 235/379 |
| 8,302,854 B1 * | 11/2012 | Grimm et al. ................. | 235/379 |
| 8,348,675 B2 * | 1/2013 | Dohrmann ..................... | 434/326 |
| 8,396,766 B1 * | 3/2013 | Enright et al. .................. | 705/35 |
| 2012/0072294 A1 * | 3/2012 | Vilcauskas et al. ........ | 705/14.73 |

FOREIGN PATENT DOCUMENTS

| | | |
|---|---|---|
| JP | PUPA 10-136347 | 5/1998 |
| JP | PUPA 11-195030 | 7/1999 |
| JP | PUPA 2000-076074 | 3/2000 |
| JP | 2000315189 A | 11/2000 |
| JP | PUPA 2001-222490 | 8/2001 |
| WO | WO 99/35751 | 5/1999 |
| WO | WO 00/29966 | 5/2000 |

OTHER PUBLICATIONS

Japanese Office Action, "Decision of Refusal", Patent Application No. 2001-339945, Feb. 2, 2006, pp. 1-6.
"Communication Protocal Dictionary," Nov. 11, 1996, pp. 539-544.
"Electronic Commerce," Aug. 1, 1996, pp. 172-174.
"Distributed Software Development," Jul. 10, 1996, p. 209.

(Continued)

*Primary Examiner* — Sargon Nano
(74) *Attorney, Agent, or Firm* — Hoffman Warnick LLC

(57) ABSTRACT

To prevent unexpected Http session timeouts on the web and enable reliable business processing on the Web, a unit for notifying a user of timeouts of Web and a unit for the user to change timeout intervals in the processing of Web applications such as online shopping. The present invention includes an application system which provides application services via a network and clients which receive the application services via the network, in which the application system sends to the clients a program for generating a window which displays information about timeouts on Web sessions of application services, and the clients display the window based on the program received.

22 Claims, 13 Drawing Sheets

OTHER PUBLICATIONS

"Standard Internet Text," Mar. 11, 1996, p. 154.

Information Materials from IDS Japanese affiliate (Dec. 16, 2006).

Matsuyama, "The Trajectory of Solutions", pp. 180-185, Nikkei Open System 2001 No. 95, 2003-00480-012.

Mishima, "Servlet/JSP; Programming Techniques", pp. 175, 176, 185, 186, 188, 189, Soft Bank Publishing, 2003-00069-001, ISBN4-7973-1441-9, Printed in Japan.

Nishizawa, "ASP Pocket Reference", 2001, pp. 100-111, ISBN4-7741-1217-8 C3055, Printed in Japan.

Kushimiya et al., "Chapter 2, Part 1: In-Depth Research on the Latest Application Servers: WebSphere Application Server 3.5 (Development Based on VisualAge and Studio and Operation of WebSphere)", 2000, pp. 48-57, Java Press vol. 14.

Hougland et al., "Core JSP", pp. 137-140, 144-146, Copyright 2001, Published in Japan by Pearson Education Japan.

Miyai, "Web Computing Primer, Part 2: Security of Web Systems", Feb. 2000, pp. 202-208, Nikkei Open Systems No. 83.

Information Materials for IDS, Prepared by Natsumi Matsushita, Apr. 3, 2008.

Matsushita, "Nformation Materials for IDS", Date of JPO Office Action is May 26, 2009, date of IDS is Jul. 15, 2009.

Ben-Natan et al., English Abstract translation of "Building up Latest Web Application by Using WebSphere", Version 1, May 30, 2001.

Schildt, "Windows 2000 Programming from the Ground Up", Sep. 30, 2000, English translation and JP version.

Remote Link Control of Inter-university Satellite Network (Space Collaboration System), Kikuo Asai et al., IPSJ Transactions, vol. 40, No. 11, pp. 3957-3966, 1999.

"Mastering TCP/IP Application Version", Philip Miller, 22.4 PPP (Point-to-Point Protocol), pp. 483 (English translation), 1997.

* cited by examiner

NETWORK SYSTEM, SERVER, CLIENT TERMINAL, TIMEOUT INFORMATION PROVIDING METHOD, TIMEOUT INFORMATION DISPLAY METHOD, AND PROGRAMS

FIELD OF THE INVENTION

The present invention relates to servers that provide Web-based applications. More particularly, it relates to an application server which improves the usability of Web applications.

BACKGROUND

Recently, with the explosive growth in the number of Internet users, the way people use the Internet has become more sophisticated. It has become a common practice for users, for example, to buy products on Web pages. Under these circumstances, the B-to-C (Business-to-Consumer) market for electronic commerce conducted by businesses with respect to consumers has been growing sharply, and many companies have set out to run virtual malls.

In the Business-to-Consumer area, there are various uncomplicated Web-based applications. When using such Web-based applications, the user performs searches, fills in forms, enters input, and so forth through a Web-browser screen input on a client machine.

However, securities transactions, auctions, purchases of travel tickets, and so forth which involve complicated procedures may take longer than expected when the user experiences difficulty making entries on the Web-browser screen. If the user attempts to go to the next screen after long time lapse for entries like this, a message such as "Data Missing" or, for "The screen is no longer valid" may be displayed, meaning all the data entered up until then has been lost. This is because an object (Http session object) which stores client-specific information has become invalid due to a timeout on the application server which provides Web pages. Application servers are provided with this feature as standard.

According to conventional application models, such timeouts are managed only on the side of the application server. Consequently, the user repeats input operations and the like without realizing that a timeout has occurred and often feels frustrated at having wasted time on useless data entry. On the other hand, the company may lose valuable business opportunities. Thus there is a great demand for system improvements in order to win intensifying competition.

SUMMARY

The present invention prevents unexpected timeouts on the Web (http session timeouts) by providing means of notifying the user of timeouts and means for the user to change timeout intervals in the processing of Web applications such as online shopping, and thus enables reliable business processing on the Web. Specifically, a network system to which the present invention is applied comprises a server which provides application services via a network; and client terminals which receive the application services via the network, wherein the server sends the client terminals a program for generating a window which displays information about timeouts on Web sessions of application services, and the client terminals display the window based on the program received.

Also, the present invention includes a server which provides Web applications to a client via a network, comprising session object creating means for creating a session object which stores identification information for identifying the client; window providing means for providing a program of a window which displays timeout information contained in the session object, to the client via the network; time information acquisition means for acquiring time information about the time remaining before a timeout from the session object for the client; time information sending means for sending the acquired time information against the client; extension instruction receiving means for receiving, via the network, extension instructions given to the window; time extension means for extending the time remaining before the timeout contained in the session object, based on the received extension instructions; and updated-time sending means for sending the client the updated time of the timeout resulting from the extension.

Viewed from another angle, the server to which the present invention is applied comprises first means for creating a session object based on client information received from the client and providing to the client a program of a window which displays information about the time remaining before a timeout on the session object; second means for providing information about the remaining time displayed in the window to the client; and third means for providing to the client information about updated remaining time based on a time extension request from the client.

The present invention also includes a client terminal connected to a network. Specifically, a client terminal to which the present invention is applied comprises initial-screen program receiving means for accessing the URL of a Web server connected to a network and receiving an initial-screen program for displaying an initial screen; user information sending means for sending the Web server a user name and password entered on the initial-screen program; program receiving means for receiving from the Web server a window program which generates a window for providing time information about a timeout on a Web session as well as data entry program for data entry; display means for displaying a screen for data entry based on the data entry program received and displaying the window based on the window program; and extension instructing means for giving instructions to extend the time remaining before the timeout based on a window displayed in the display means.

The window displayed in the display means may be displayed as a pane in a browser screen which displays a screen for the data entry. On the other hand, this window may be displayed in a window separate from the browser which displays the screen for the data entry.

Also, a client terminal to which the present invention is applied comprises acquisition means for acquiring time information about timeouts on Web sessions of the Web applications; display means for displaying the time information acquired by the acquisition means; and updated-time information acquisition means for acquiring, from the application server, updated time information about the time extended at extension instructions with respect to the time information displayed in the display means, wherein the display means displays the updated time information acquired by the updated-time information acquisition means.

Furthermore, the present invention includes a timeout information providing method. Specifically, the method comprises the steps of creating a session object based on client information received via a network; sending a client a program of a window which displays time information up to a timeout registered in the session object; acquiring information about the time remaining before a timeout from the session object; and sending the acquired remaining-time information to the client.

When this method is provided with the steps of receiving a request from the client to extend the remaining time; extending the time remaining before the timeout using the session object; and sending to the client updated remaining time information about the extended remaining time, it is possible to give the client an opportunity to extend timeout intervals, making it possible to avoid the problem of an object itself disappearing regardless of the intentions of the client.

Also, a timeout information display method to which the present invention is applied comprises the steps of receiving the time remaining before a timeout on a Web session, from an application server connected to a network; displaying the remaining time received from the application server; starting an internal timer; updating and displaying the remaining time at each update event of the internal timer; receiving an extension request event in relation to the remaining time displayed; and displaying updated remaining time received from the application server in response to the extension request.

The present invention also includes a program for making a computer execute designated functions, including a function of creating a session object based on client information received via a network; a function of sending a client a program of a window which displays time information up to a timeout registered in the session object; a function of acquiring time information about the time remaining before a timeout using an API (Application Program Interface) of the session object; and a function of sending the remaining-time information to the client; a function of receiving a request from the client to extend the remaining time; a function of extending the time remaining before the timeout, based on the extension request, using the session object; and a function of sending to the client updated remaining time information about the extended remaining time.

Methods of providing such programs include the use of a storage medium which stores the programs to be executed by the computer, in computer-readable form. An example of such a storage medium is the CD-ROM medium or the like. The programs are read by a CD-ROM reader on a computer. For example, they may be stored on a hard disk in a server computer for later execution. Also, the programs may be supplied to server computers by a program-transmission device via a network. Such a program-transmission device needs only to comprise memory for storing the programs and program-transmission means for supplying programs via a network.

The present invention also includes a program for implementing in a computer connected to an application server via a network, a function of acquiring, via the network, the time remaining before a timeout on a Web session of the application server; a function of displaying the remaining time received; a function of starting an internal timer as well as updating and displaying the remaining time at each timer update event; a function of receiving an extension request event in relation to the remaining time updated and displayed; and a function of displaying updated remaining time received from the application server via the network in response to the extension request. This program may be supplied, for each application or independently of applications, by a program-transmission device of an application server or the like via a network. Also, it may be supplied on a designated storage medium.

DETAILED DESCRIPTION

The present invention will be described in detail with reference to the embodiment shown in the accompanying drawings.

Figure 1:
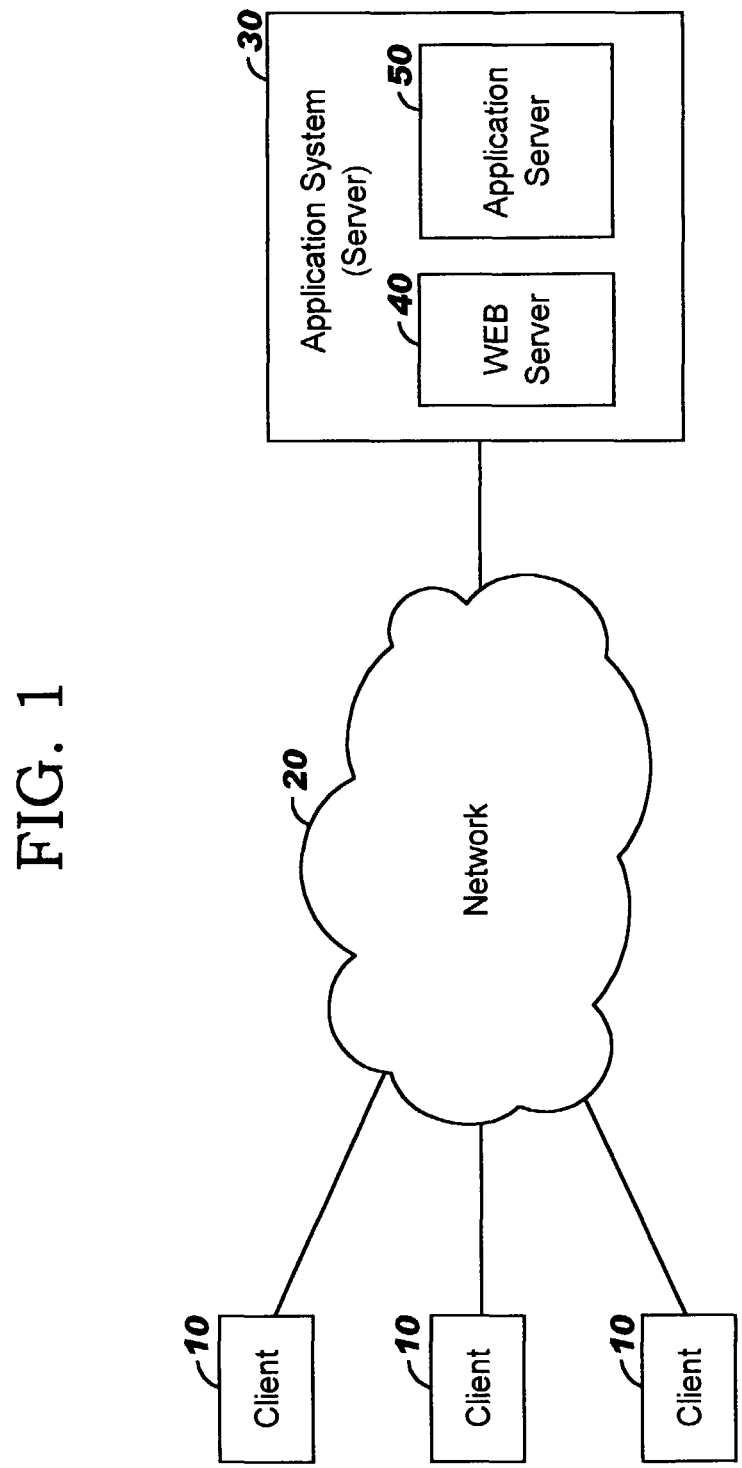
FIG. 1 is a diagram showing an overall configuration of a network system to which the invention may be applied.

FIG. 1 is a diagram showing an overall configuration of a network system to which this embodiment may be applied. This network system is connected with clients 10—user terminals which receive application services—via a network 20 such as the Internet. The network 20 is also connected with an application system 30. In terms of role separation, the application system 30 comprises a Web server 40 which provides HTML services and an application server 50 which provides application services. However, it is also possible to view the application system 30 as a single server which combines the Web server 40 and application server 50.

Figure 2:
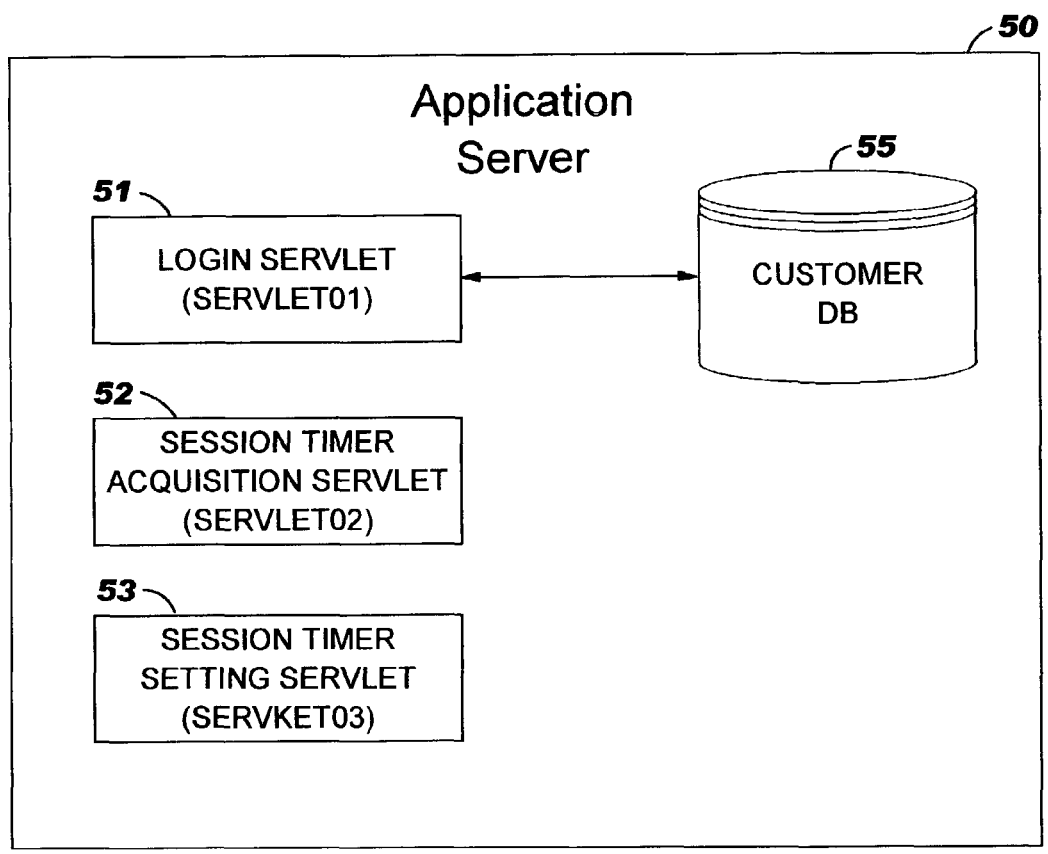
FIG. 2 is a diagram showing a configuration of an application server.

FIG. 2 is a diagram showing a configuration of the application server 50. The application server 50 to which this embodiment is applied comprises a login servlet (Servlet01) 51, session timer acquisition servlet (Servlet02) 52, and session timer setting servlet (Servlet03) 53. Also, it comprises a customer database (DB) 55 which stores the IDs and passwords (PW) of customers.

The login servlet (Servlet01) 51 creates an object (Sess01) for storing user information of a client 10 and a cookie (Cookie01) for identifying the client 10 and sends them to the client 10 together with an HTML file containing an Applet which generates a window (referred to as Webpad) for displaying the time remaining before a timeout on a Web session. The WebPad window displays a timeout value at regular intervals and provides means for changing the timeout interval if the user desires. The timeout value represents the time when an object itself disappears regardless of the intention of the user if no communication takes place between the client 10 and application system 30 which is a server. Since WebPad is viewed by operating systems simply as a window (software), it can be implemented in any operating system which has a window system.

The session timer acquisition servlet (Servlet02) 52 acquires the time remaining before a timeout using an API (Application Program Interface) of the Http session object (Sess01) and sends it to the client 10. The session timer setting servlet (Servlet03) 53 extends the time remaining before the timeout using the API (Application Program Interface) of the Http session object (Sess01) and sends the updated remaining time to the client 10.

Figure 3:
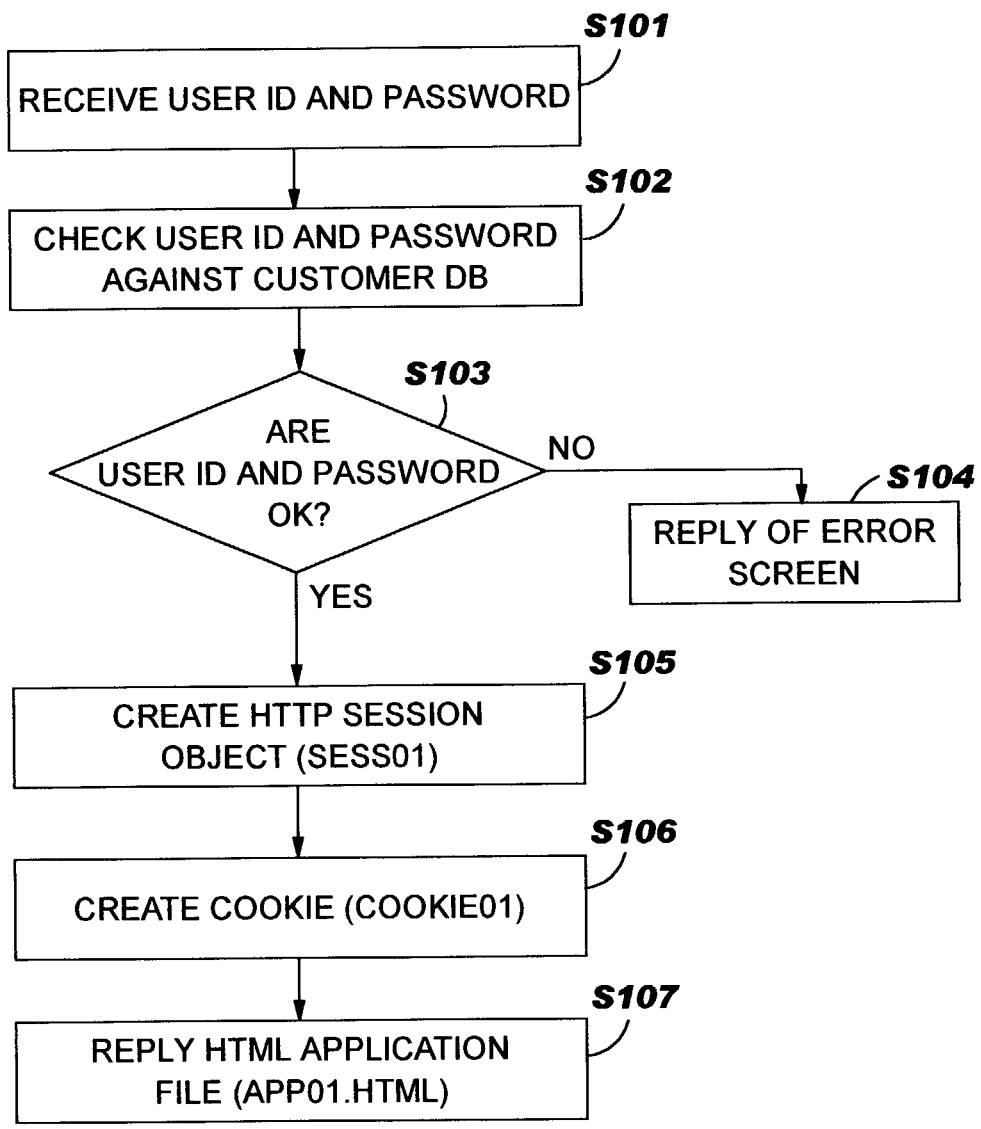
FIG. 3 is a flowchart showing processes of a login servlet (Servlet01)

FIG. 3 is a flowchart showing processes of the login servlet (Servlet01) 51. First, Servlet01 receives the ID and password of a user from the client 10 (Step 101) and checks the received user ID and password against the customer database 55 (Step 102). Based on the results of the check, Servlet01 judges whether the user is OK or not (Step 103). If the user is not OK, Servlet01 returns an error screen (Reply: Response) (Step 104). If the user is OK, Servlet01 creates an Http session object (Sess01) capable of storing user information of the client 10 (Step 105). Then, Servlet01 creates a cookie (Cookie01) for identifying the client 10 (Step 106) and returns the HTML file (APP01.html) of an application (Reply: Response)(Step 107). In other words, a program for generating the window (WebPad) is sent together with a program for application-related data entry. The HTML file (APP01.html) of the application is an HTML file containing the HTML file of WebPad as a pane of a frame. It consists of Entry.html and WebPad.html.

Methods for user authentication include methods, such as challenge-response authentication, which employ Web server 40 capabilities and a method employing certificates issued by U.S. company VeriSign Inc. as well as a method employing the login servlet (Servlet01) 51.

Figure 4:
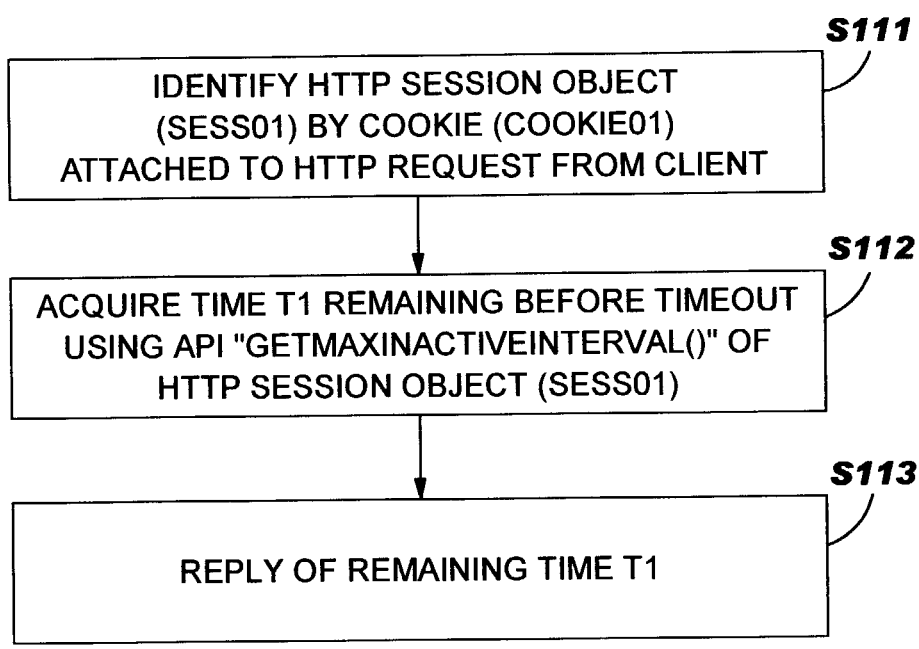
FIG. 4 is a flowchart showing processes of a session timer acquisition servlet (Servlet02)

FIG. 4 is a flowchart showing processes of the session timer acquisition servlet (Servlet02) 52. First, the session timer acquisition servlet (Servlet02) 52 identifies the Http session object (Sess01) by the cookie (Cookie01) attached to an Http request from the client 10 (Step 111). Then it acquires the time T1 remaining before the timeout using an API "GetMaxInActiveInterval( )" of the Http session object (Sess01) made by the login servlet (Servlet01) 51 (Step 112). Next, it returns the acquired remaining time T1 (Reply: Response) (Step 113).

Figure 5:
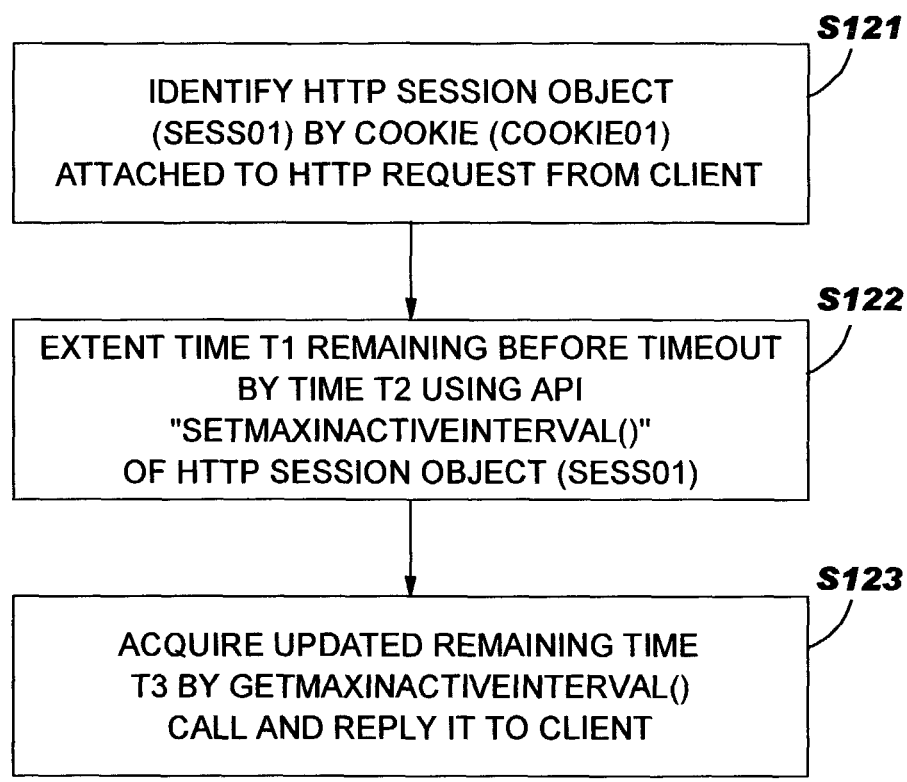
FIG. 5 is a flowchart showing processes of a session timer setting servlet (Servlet03)

FIG. 5 is a flowchart showing processes of the session timer setting servlet (Servlet03) 53. First, the session timer setting servlet (Servlet03) 53 identifies the Http session object (Sess01) by the cookie (Cookie01) attached to the Http request from the client 10 (Step 121). Next, it extends the time T1 remaining before the timeout T2 using the API "SetMaxInActiveInterval( )" of the Http session object (Sess01) created by the login servlet (Servlet01) 51 (Step 122). Then, it acquires the updated remaining time T3 by the GetMaxInActiveInterval( ) call and returns it to the client 10 (Reply) (Step 123).

Now, the processes performed by the client 10 will be described.

Figure 6:
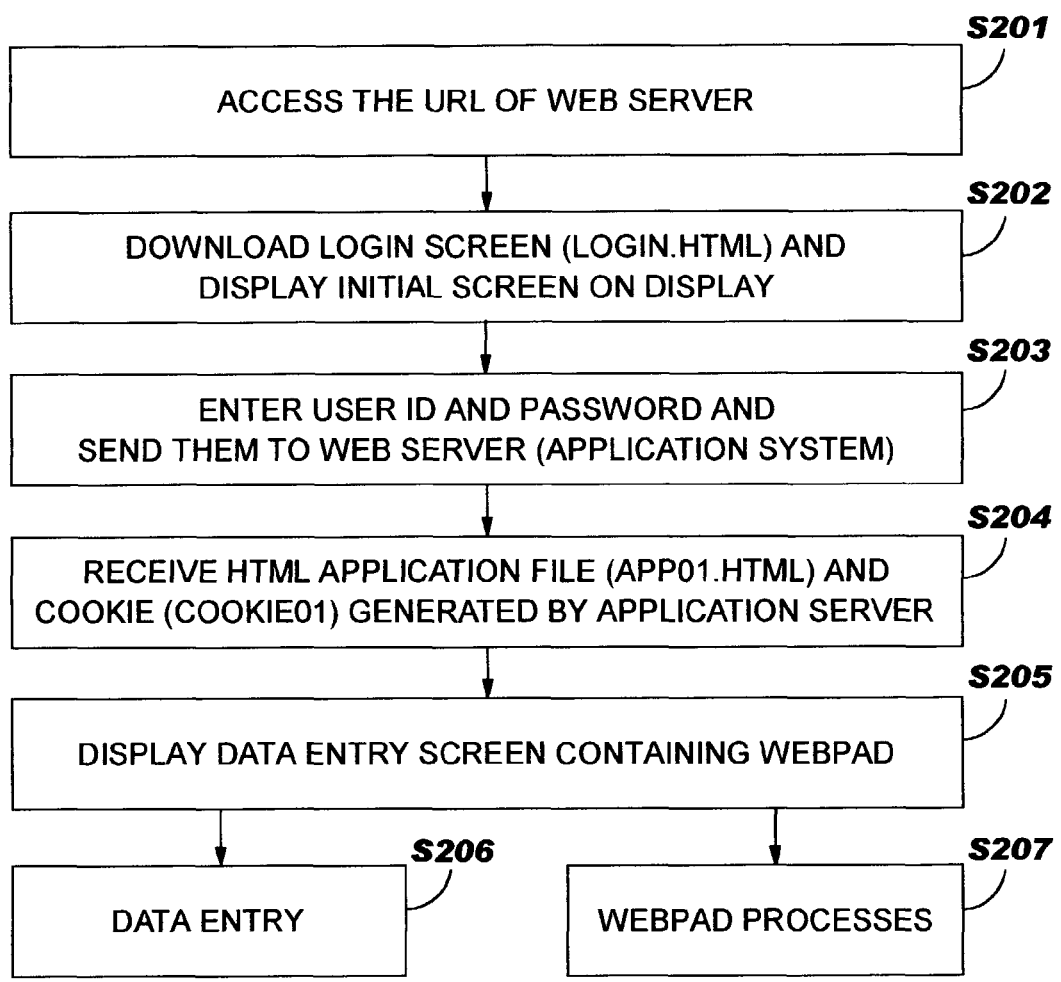
FIG. 6 is a flowchart of processes performed by a client.

FIG. 6 is a flowchart of processes performed by the client 10. The user accesses the URL of the web server 40 from the client 10 terminal (Step 201), downloads a login screen (Login.html), and displays an initial screen on a display (Step 202). Then the user enters his/her user ID and password, which are sent to the Web server 40 (application system 30) (Step 203). If there is any problem with the user ID or password, Error.html is sent from the application system 30 for error display.

If there is no problem with the user ID and password, the HTML application file (APP01.html) and cookie (Cookie01) generated by the application server 50 are received from the application system 30 (Step 204) and a data entry screen containing WebPad is displayed (Step 205). Then, data entry processing (Step 206) and WebPad processes (Step 207) are carried out. Two HTML files (Entry.html and WebPad.html) have been embedded in the received HTML application file (APP01.html) by means of Frame tags. The user can enter data by checking the timeout interval with reference to the WebPad display on the screen produced by the WebPad processes. If the user judges that there is not enough time, he/she can extend the time remaining before the timeout, for example, by entering an extended time on WebPad and sending it to the application server 50 with a click of a Send button. At this time, the Http session has not timed out, and thus the processing can be continued with no missing data.

Figure 7:
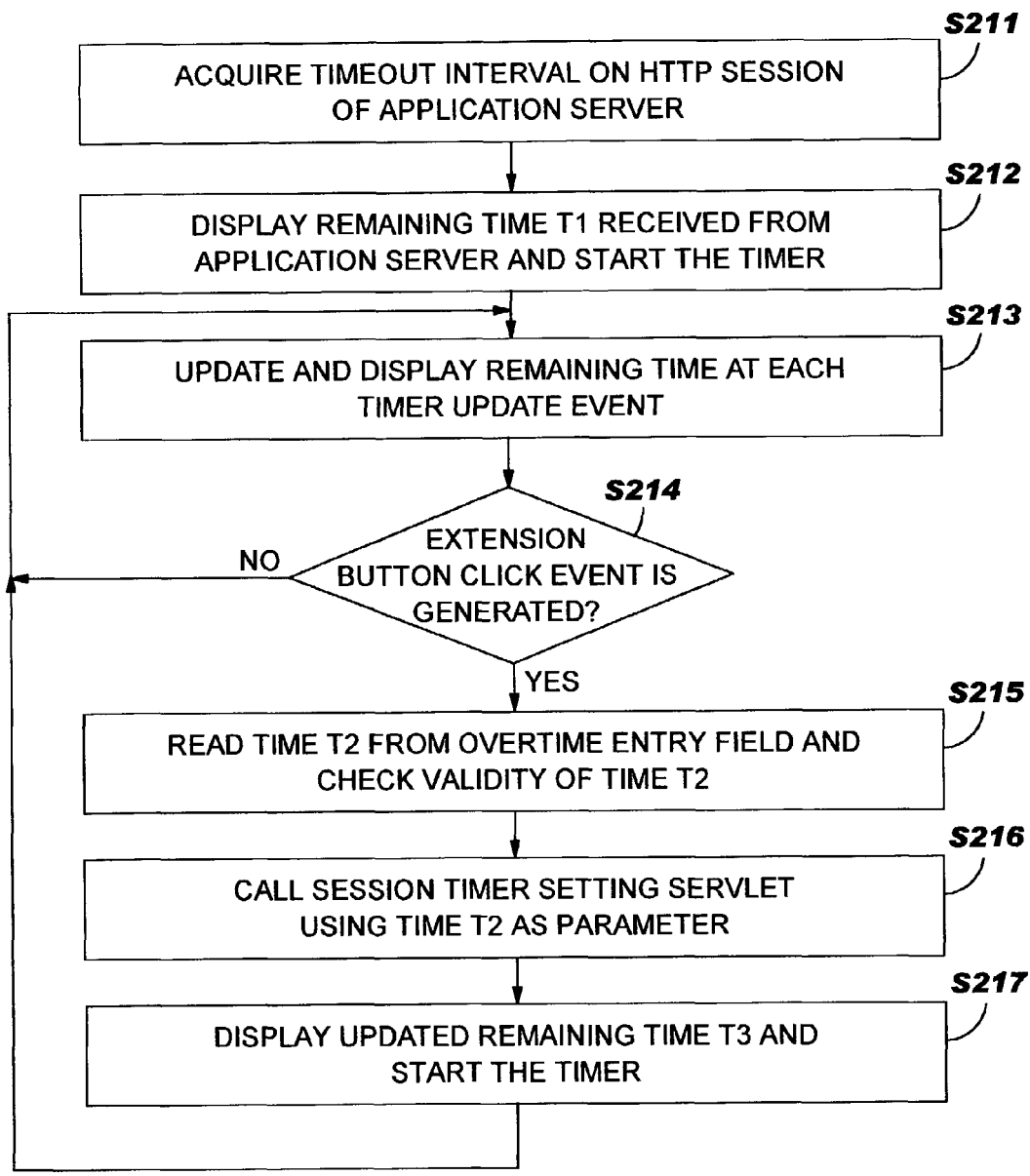
FIG. 7 is a flowchart of WebPad processes.

FIG. 7 is a flowchart of WebPad processes. First, the WebPad processing acquires the timeout interval (the time remaining before the timeout) on the Http session of the application server 50 (Step 211). After generation, WebPad calls the session timer acquisition servlet (Servlet02) 52 of the application server 50 and receives the remaining time T1 which was acquired by GetMaxInActiveInterval( ) called by the session timer acquisition servlet (Servlet02) 52. Then, it displays the remaining time T1 received from the application server 50, starts the timer (Step 212), and updates and displays the remaining time at each timer update event (Step 213).

Next, WebPad judges whether an extension button click event has occurred or not (Step 214). If it has not, WebPad returns to Step 213. If it has, WebPad reads time T2 from an overtime entry field and checks the validity of the time T2 (Step 215). Then, Webpad calls the session timer setting servlet (Servlet03) 53 using the time T2 as a parameter (Step 216). Then, it displays the updated remaining time T3, starts the timer (Step 217), and returns to Step 213.

Figure 8:
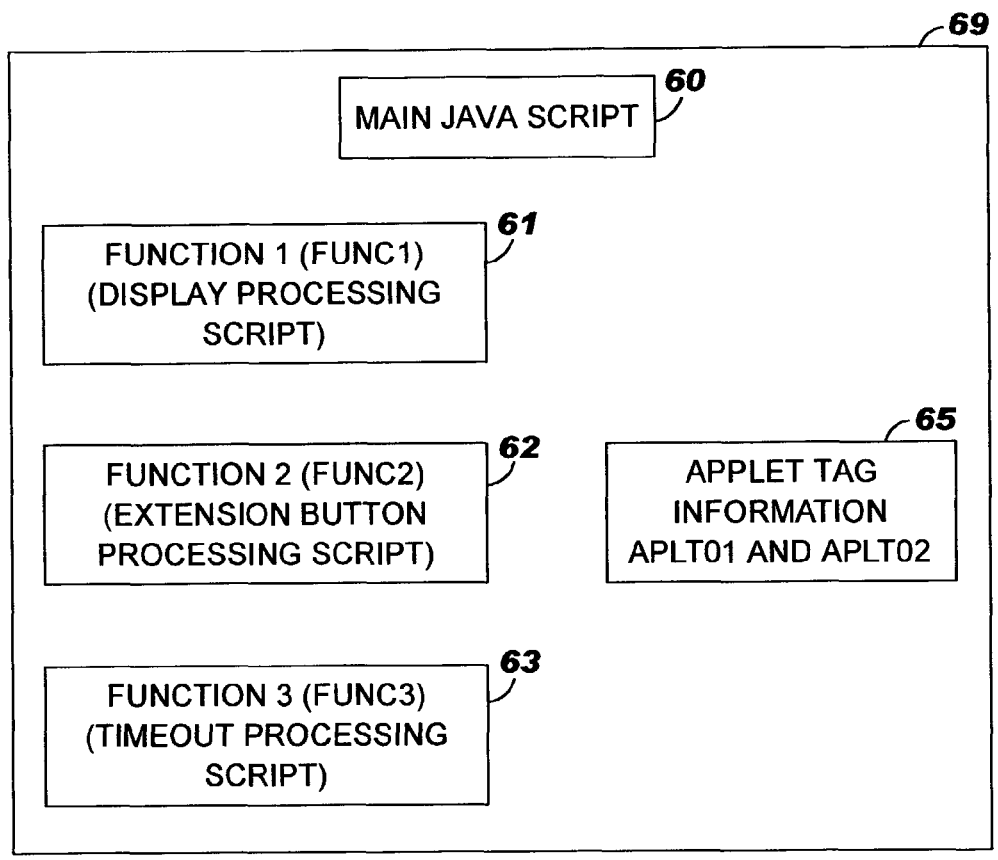
FIG. 8 is a diagram showing components of WebPad.html.

Now, Webpad.html, a HTML file which implements WebPad will be described. FIG. 8 is a diagram showing components of Webpad.html 69. As described above, WebPad.html 69 is embedded in the HTML application file (APP01.html) replied from the login servlet (Servlet01) 51 of the application server 50. As shown in FIG. 8, WebPad.html 69 consists of main Java Script 60 which displays session timeout values and updates them using an internal timer; Script functions including function 1 (func1) 61 which is a display processing Script, function 2 (func2) 62 which is an extension button processing Script, function 3 (func3) 63 which is a timeout processing Script; applet tag information 65; and so forth.

Function 1 (func1) 61, which is a display processing function, calls an applet (Aplt01) for starting the session timer acquisition servlet (Servlet02) 52, acquires a Session timeout interval, and then sets the value of the session timer in the value SSTM of a global variable. Function 2 (func2) 62, which is called by an event handler when the extension button is clicked (or when the Send button is clicked after an overtime is specified, etc.), calls an applet (Aplt02) for extending a Session time in this function and writes the extended session time into the value SSTM of the global variable. Function 3 (func3) 63, which is called when the internal timer times out, updates the session timeout interval TM01 ("SSTM−1" minutes if the internal timer is set at 1 minutes), redisplays the updated session timeout interval TM01, and sets the next internal timer (1 minute).

The Java applets called according to the applet tag information 65 include Aplt01 and Aplt02. Aplt01 is a Java applet with a method Getter( ) which takes a String Cookie as an argument. Getter creates an URL object (using Host, Port, and other arguments) and URL connection object and calls the session timer acquisition Servlet (Servlet02) 52 by attaching an Http request header and a Cookie to the created objects. The return value from the servlet is a session timeout value, which is regarded as the return value of the Getter( ) method. Aplt02 is a Java applet with a method Setter( ) which takes as arguments a String-Type Cookie and Integer type overtime T1. Setter creates an URL object (using Host, Port, and other arguments) and URL connection object and calls the Session timer setting servlet (Servlet03) 53 by attaching an Http request header and a Cookie to the created objects. The return value from the servlet is a new session timeout value, which is regarded as the return value of the Setter( ) method.

Figure 9:
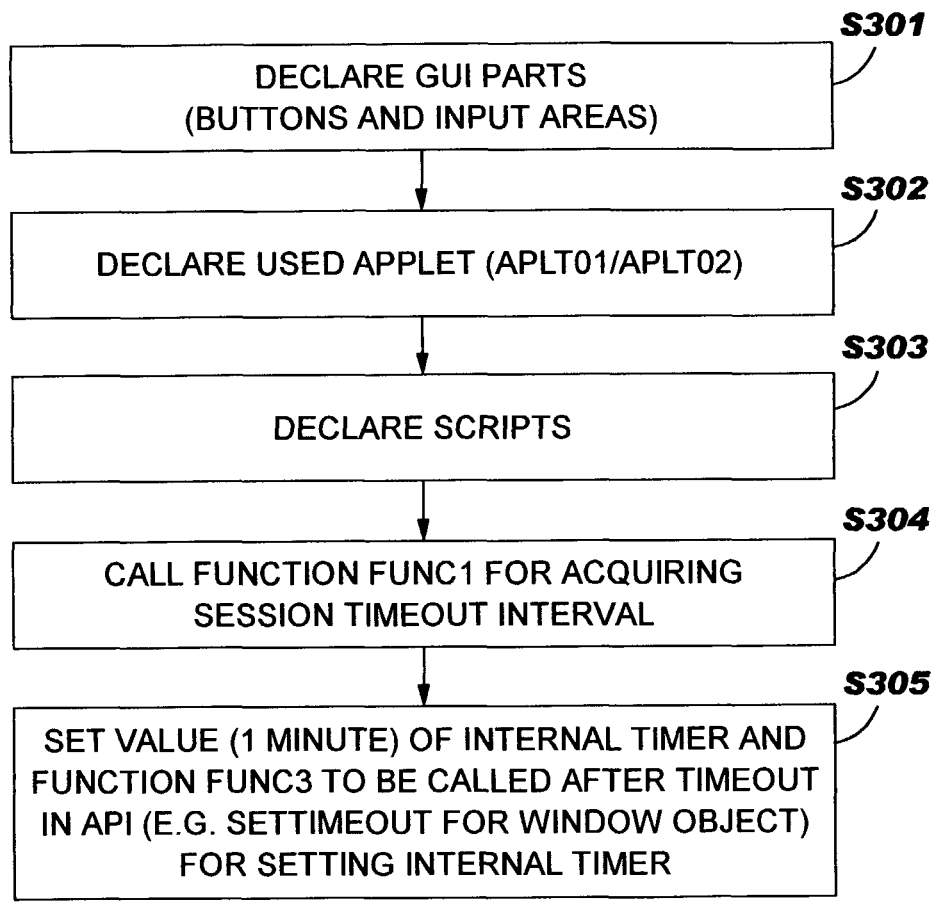
FIG. 9 is a flowchart showing processes of WebPad.html

FIG. 9 is a flowchart showing processes of WebPad.html which consists of the components shown in FIG. 8. First, WebPad.html declares GUI parts (buttons and input areas) (Step 301) as well as the applet (Aplt01/Aplt02) to be used (Step 302). Next, it declares Scripts (Step 303) and calls the function 1 (func1) 61 for acquiring the session timeout interval (Step 304). Then, it sets the value (1 minute) of the internal timer and the function 3 (func3) 63 to be called after the timeout, in the API (e.g., setTimeout for the Window object) for setting the internal timer (Step 305).

Figure 10B:
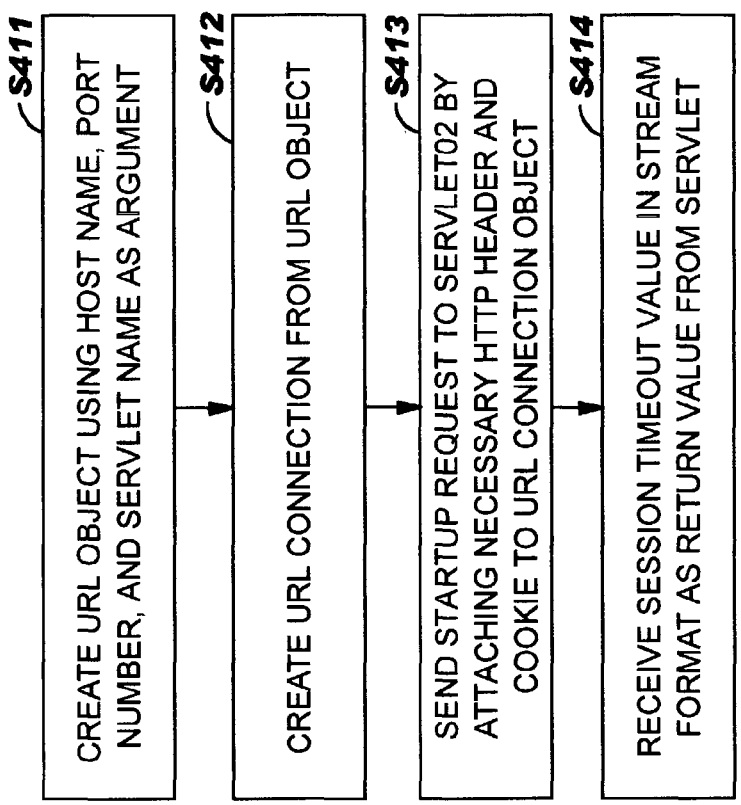
FIGS. 10A and 10B are flowcharts showing processes of a function 1 (func1) called in Step 304.
Figure 10A:
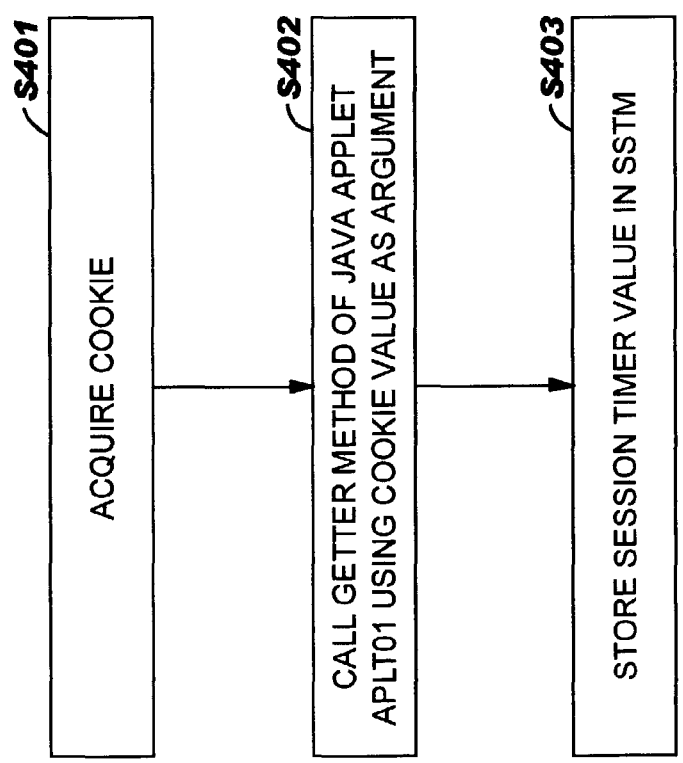

FIGS. 10A and 10B are flowcharts showing processes of the function 1 (func1) 61 called in Step 304. FIG. 10A shows a flow of main processes of the function 1 (func1) 61 while FIG. 10B shows the processes of the Getter method of the Java applet (Aplt01) called by the function 1 (func1) 61. As shown in FIG. 10A, the function 1 (func1) 61 acquires a Cookie (Step 401) and then calls the Getter method of the Java applet (Aplt01) using the Cookie value as an argument (Step 402). Then, the Session timer value obtained through the processes shown in FIG. 10B is stored in the value SSTM of the global variable (Step 403).

As shown in FIG. 10B, the Getter method (String Cookie) of the Java applet (Aplt01) called in Step 402 creates a URL object using a host name, port number, and servlet name as arguments (Step 411) and then creates a URL connection from the URL object (Step 412). Next, it sends a startup request to the session timer acquisition servlet (Servlet02) 52 of the application server 50 by attaching a necessary Http header and Cookie to the URL connection object (Step 413). Then, it receives the session timeout value in a Stream format as a Return value from the session timer acquisition servlet (Servlet02) 52 (Step 414). This Return value is used in the process of Step 403 shown in FIG. 10A.

Figure 11:
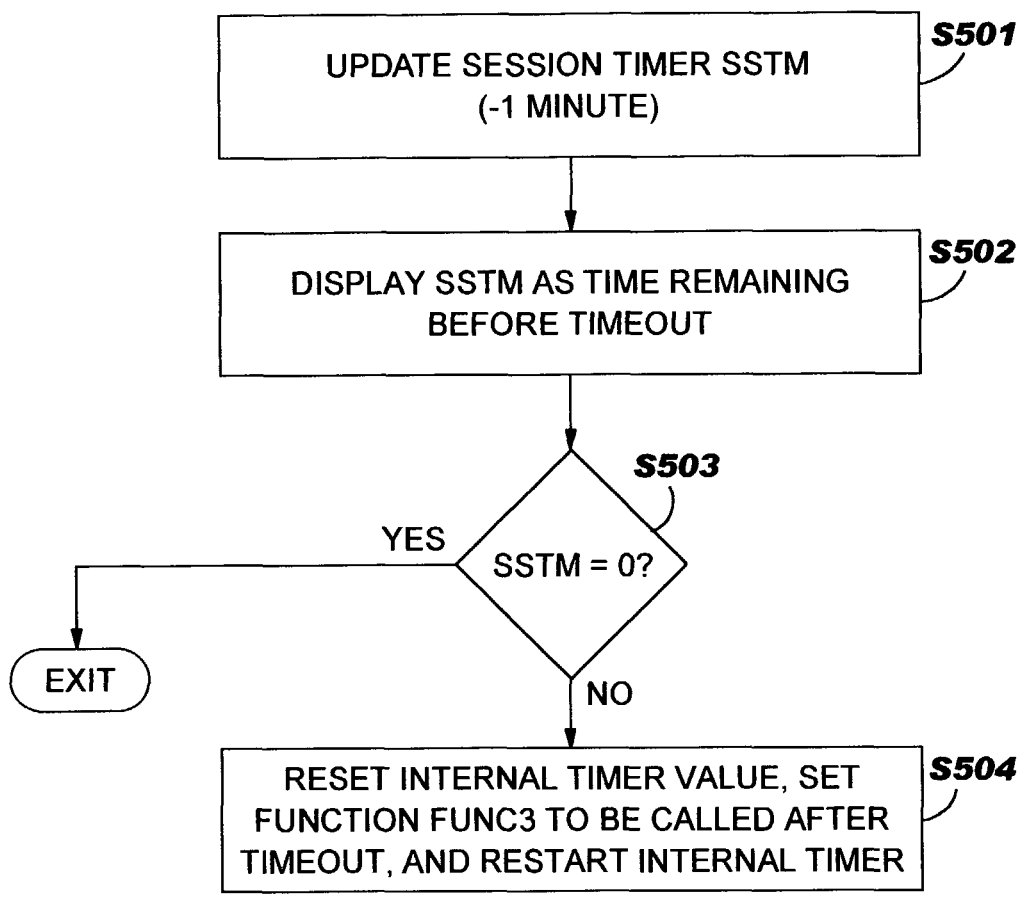
FIG. 11 is a flowchart showing processes of a function 3 (func3) in case of a timer event interrupt in WebPad.html.

FIG. 11 is a flowchart showing processes of the function 3 (func3) 63 in case of a timer event interrupt on WebPad.html. In case of a timer event interrupt, the function 3 (func3) 63 updates the value SSTM of the global variable of the session timer (decremented by 1 minute) (Step 501) and displays the updated SSTM as the time remaining before the timeout (Step 502). Then it is judged whether or not the SSTM is zero (Step 503). If it is zero, the processing is terminated. If it is not zero, the internal timer value is set again, the function 3 (func3) 63 to be called after the timeout is set, and the internal timer is restarted (Step 504).

Figure 12B:
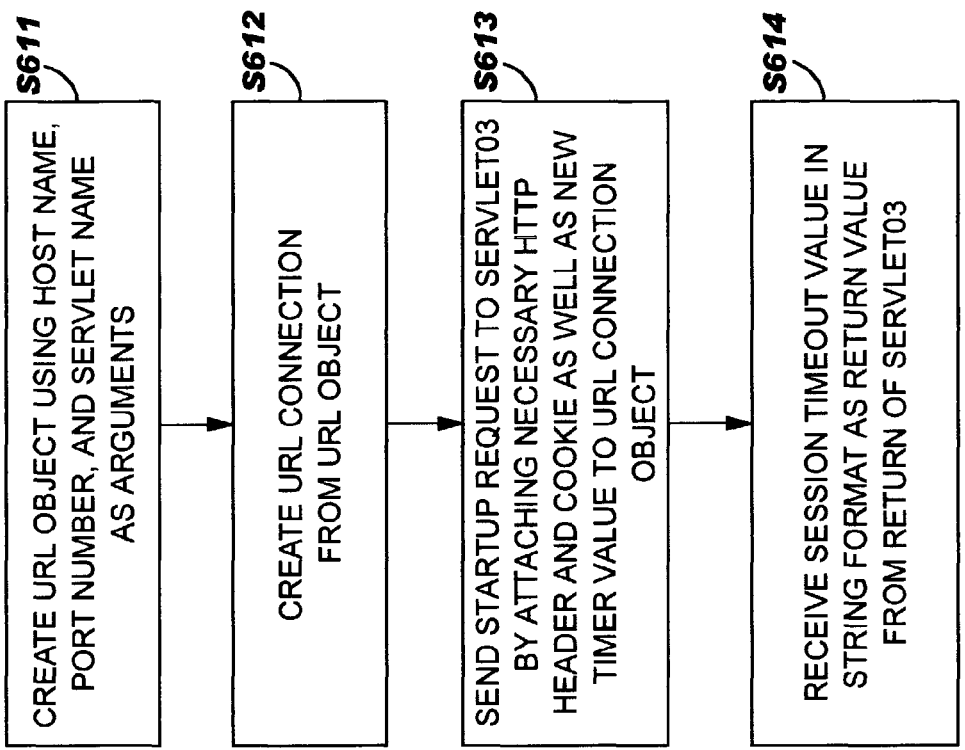
FIGS. 12A and 12B are flowcharts showing processes of a function 2 (func2) after the user sets an overtime and clicks a Send button on WebPad.html, generating an event interrupt.
Figure 12A:
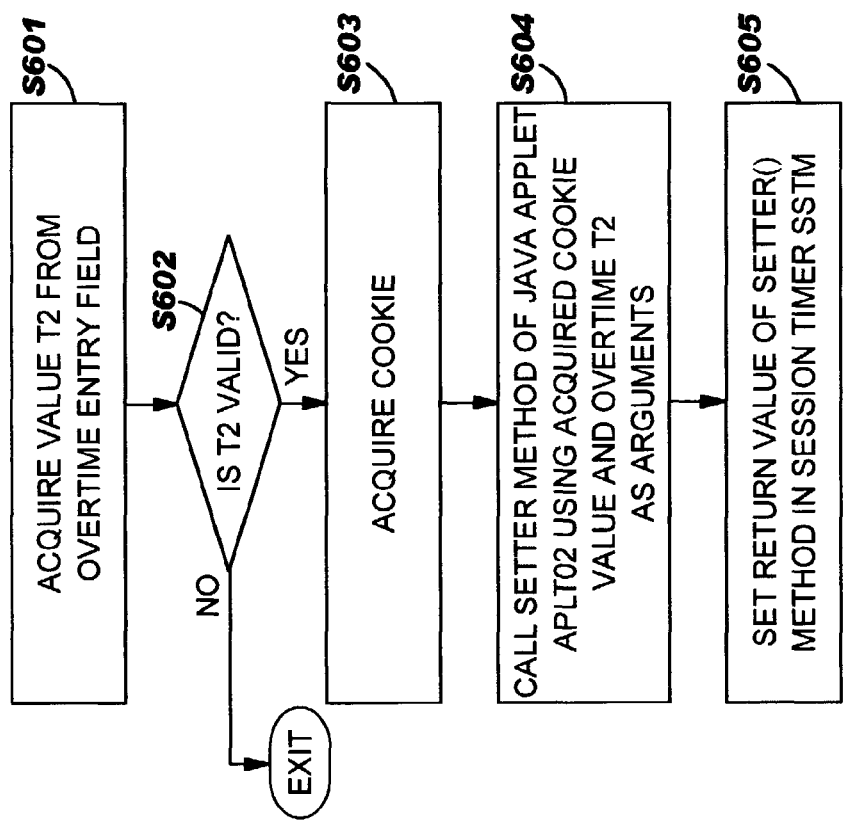

FIGS. 12A and 12B are flowcharts showing processes of the function 2 (func2) 62 after the user sets an overtime and clicks the send button on WebPad.html, generating an event interrupt. FIG. 12A shows a flow of main processes of the function 2 (func2) 62 while FIG. 12B shows the processes of the Setter method of the Java applet (Aplt02) called by the function 2 (func2) 62.

As shown in FIG. 12A, in case of an event interrupt, the function 2 (func2) 62 acquires the time T2 from the overtime entry field (Step 601) and judges whether the time T2 is valid or not (Step 602). If it is not valid, the function 2 (func2) 62 finishes its processes. If it is valid, the function 2 (func2) 62 acquires a Cookie (Step 603). Then, the function 2 (func2) 62 calls the Setter method of the Java applet (Aplt02) using the acquired Cookie value and overtime T2 as arguments (Step 604). The Return value of the Setter( ) method is set in the session timer SSTM (Step 605).

As shown in FIG. 12B, the Setter method of the Java applet (Aplt02) called in Step 604 creates a URL object using a host name, port number, and servlet name as arguments (Step 611) and then creates a URL connection from the URL object (Step 612). Next, it sends a startup request to the session timer setting servlet (Servlet03) 53 by attaching a necessary Http header and Cookie as well as a new timer value to the URL connection object (Step 613). Then, it receives the session timeout value in a stream format as a Return value from the session timer setting servlet (Servlet03) 53 (Step 614). This Return value is used in the process of Step 605 shown in FIG. 12A.

Figure 13B:
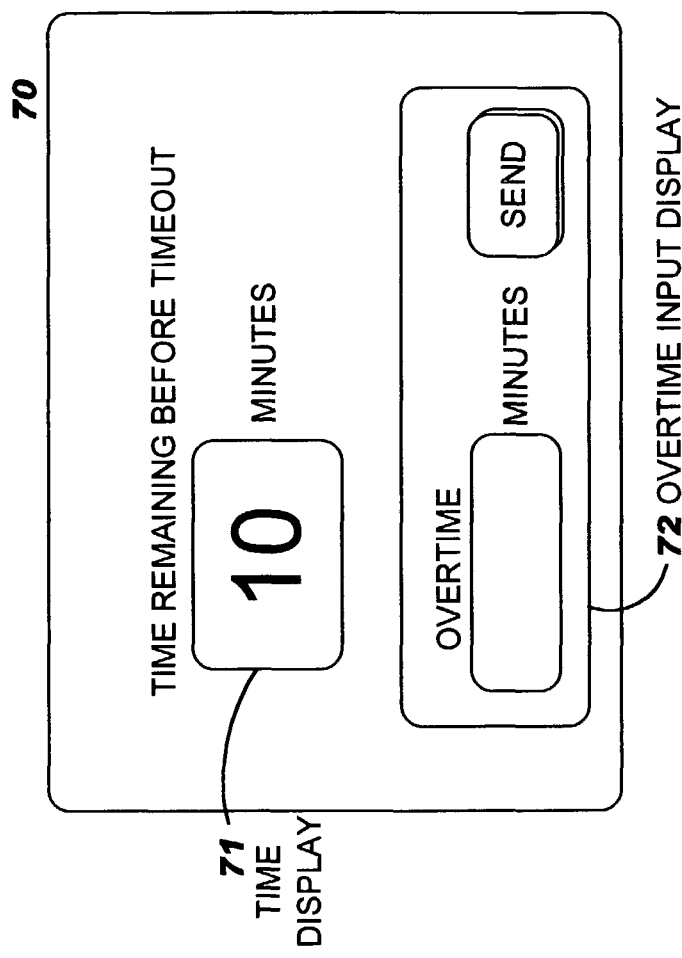
FIGS. 13A and 13B show display examples of a data entry screen displayed on a browser of the client.
Figure 13A:
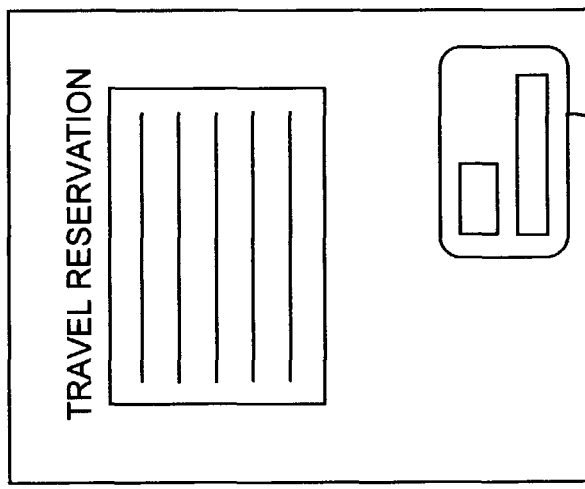

FIGS. 13A and 13B show display examples of a data entry screen displayed on a browser of the client 10. FIG. 13A shows the Data Entry screen containing WebPad while FIG. 13B shows an example of a GUI (Graphical User Interface) on WebPad. The data entry screen shown in FIG. 13A is displayed based on the HTML application file (APP01.html) obtained from the login servlet (Servlet01) 51 of the application server 50. It presents not only a typical entry screen such as a travel reservation entry screen, but also a WebPad display 70 which is a window for displaying the time remaining before a timeout. The WebPad display 70 is generated, by means of Frame tags, as a pane in a browser screen run by the client 10.

The WebPad display 70 shown in FIG. 13B consists of a time display 71 which provides information about the time remaining before a timeout and an overtime entry display 72 which allows the user to enter a desired overtime. The client 10 generates and displays the WebPad window on the browser of the client 10 machine. The time display 71 first displays the remaining time T1 obtained from the session timer acquisition servlet (Servlet02) 52 of the application server 50 and then displays the remaining time updated at each timer update event, for example, in minutes. The overtime entry display 72 allows the user to enter a desired overtime, for example, by the minute and then click the Send button to apply the extension which is desired by the user. Clicking the Send button causes the processes of the function 2 (func2) 62 shown in FIGS. 12A and 12B to be performed.

In the example of FIG. 13B, the user is allowed to enter a desired overtime, but it is also possible to provide radio buttons, i.e., a plurality of buttons, for example, at 10- or 5-minute intervals and accept the extension selected by the user by clicking a desired button. It is also possible to display information about the time remaining before a timeout, for example, by means of the length of clock hands or a bar (analog display or the like) instead of the time display 71 or in addition to the time display 71.

In the example described above, WebPad is displayed as a pane in the browser screen. However, it is also possible to provide the WebPad display 70 itself as a separate window using the "Open" function of the Java (R) Script window object, or display the timeout interval in the original window and display only the overtime panel in a separate window. When using a separate window, Java Script's capabilities allow the window to be displayed by two to three lines of script.

In this way, according to this embodiment, the user (client 10) is provided with the window (called WebPad) which presents the timeout value normally contained in the Http session object (Sess01) at regular intervals when a Web application of the application server 50 is started at the request of the client 10. If the user wants to extend a timeout on a Web session to continue input for a travel reservation or the like, he/she can enter a desired overtime and send it to the server from the window. In short, the use of WebPad will increase the added value, reliability, and efficiency of B-to-C applications.

Although the application system 30 consists of the Web server 40 and application server 50 according to the embodiment described above, a single server may constitute the application system 30. Also, even if the Web server 40 and application server 50 are physically separated from each other, their functions are intertwined and cannot necessarily be clearly distinguished actually.

I claim:

1. A network system, comprising: a server which provides application services via a network; and client terminals which receive said application services via said network, wherein said server sends said client terminals a program for generating a window which displays information about timeouts on Web sessions in said application services, and said client terminals display said window based on said program received, wherein said server acquires, during a Web session, the time remaining before a timeout on the Web session for any given one of said client terminals in response to periodic requests that are independent of any action by a user from the given one of the client terminals and sends the time remaining to the given one of said client terminals.

2. The network system according to claim 1, wherein said server sends a program for entering data about said application services.

3. The network system according to claim 1, wherein said window is configured to accept instructions to extend the time remaining before a timeout by an extended time period provided by the user by specifying an amount of additional time by which the Web session is extended.

4. A server which provides Web applications to a client via a network, comprising: session object creating means for creating a session object which stores identification information for identifying said client; window providing means for providing a program of a window which displays timeout information contained in said session object, to said client via said network; time information acquisition means for acquiring, during a Web session, time information about the time remaining before a timeout from said session object for said client in response to periodic requests from the client that are independent of any action by the user; and extension instruction receiving means for receiving, via said network, extension instructions given to said window; and time extension means for extending the time remaining before said timeout contained in said session object by an extended time period provided by the user by specifying an amount of additional time by which the Web session is extended, based on said extension instructions received by said extension instruction receiving means.

5. The server according to claim 4 further comprising updated-time sending means for sending said client the updated time of said timeout resulting from the extension.

6. The server according to claim 4, further comprising:
time information sending means for sending said time information acquired by said time information acquisition means to said client.

7. A server which provides Web applications to a client via a network, comprising: first means for creating a session object based on client information received from said client and providing to said client a program of a window which displays information about the time remaining before a timeout on the session object; second means for providing, during a Web session, information about the remaining time displayed in said window to said client in response to periodic requests from the client that are independent of any action by a user; and third means for providing to said client information about updated remaining time based on a time extension request having an extended time period provided by the user by specifying an amount of additional time by which the Web session is extended from said client.

8. The server according to claim 7, wherein: said first means prepares cookie information based on said client information and sends the cookie information to said client; and said second means and said third means identify said session object based on said cookie information received from said client.

9. A client terminal comprising: initial-screen program receiving means for accessing a URL of a Web server connected to a network and receiving an initial-screen program for displaying an initial screen; user information sending means for sending said Web server a user name and password entered on said initial screen; program receiving means for receiving from said Web server a window program which generates a window for providing information about a timeout on a Web session and a data entry program for data entry; timeout information updating means for periodically requesting, independently of any action by a user, during a Web session, updated information about the timeout from the server; and display means for displaying a screen for data entry based on said data entry program received and displaying said window based on said window program.

10. The client terminal according to claim 9, further comprising extension instructing means for giving instructions to extend the time remaining before said timeout by an extended time period provided by the user by specifying an amount of additional time by which the Web session is extended based on a window displayed in said display means.

11. The client terminal according to claim 9, wherein said window displayed in said display means is displayed as a pane in a browser screen which displays a screen for said data entry.

12. The client terminal according to claim 9, wherein said window displayed in said display means is displayed in a window separate from the browser which displays the screen for said data entry.

13. A client terminal which receives provision of Web applications from an application server via a network, comprising: acquisition means for periodically acquiring, independently of any action by a user, during a Web session, time information about timeouts on Web sessions of said Web applications; display means for displaying the time information acquired by said acquisition means; and updated-time information acquisition means for acquiring, from said application server, updated time information about the time, extended by an extended time period provided by the user by specifying an amount of additional time by which the Web session is extended with respect to the time information displayed in said display means, wherein said display means displays the updated time information acquired by said updated-time information acquisition means.

14. A timeout information providing method, comprising the steps of: creating a session object based on client information received via a network; sending a client a program of a window which displays time information up to a timeout registered in said session object; acquiring, during a Web session, information about the time remaining before a timeout from said session object in response to periodic requests from the client that are independent of any action by a user; and sending said remaining-time information to said client.

15. The timeout information providing method according to claim 14, comprising the steps of: receiving a request from said client to extend the remaining time by an extended time period provided by the user by specifying an amount of additional time by which the Web session is extended; extending the time remaining before the timeout using said session object; and sending to said client updated remaining time information about said extended remaining time.

16. The timeout information providing method according to claim 14, wherein said window program sent to said client generates and displays the window as a pane in a browser screen of said client.

17. The timeout information providing method according to claim 14, wherein said window program sent to said client displays said time information in a window separate from the browser screen of said client.

18. A timeout information display method, comprising the steps of: receiving, independently of any action by a user, a remaining time before a timeout on a Web session, from an application server connected to a network; displaying said remaining time received from said application server during a Web session; starting an internal timer; and updating and displaying the remaining time at each periodic update event of said internal timer.

19. The timeout information display method according to claim 18, comprising the steps of: receiving an extension request event to extend the remaining time by an extended time period provided by the user by specifying an amount of additional time by which the Web session is extended in relation to the remaining time displayed; and displaying updated remaining time received from said application server in response to said extension request.

20. A program storage device readable by a machine, the program storage device storing a program of instructions executable by a machine to perform method steps comprising: creating a session object based on client information received via a network; sending a client a program of a window which displays time information up to a timeout registered in said session object; acquiring, during a Web session, time information about the time remaining before a timeout using an Application Program Interface of said session object in response to periodic requests from the client that are independent of any action by a user; and sending said remaining-time information to said client.

21. The program storage device according to claim 20, wherein the method steps further comprise: receiving a request from said client to extend the remaining time by an extended time period provided by the user by specifying an amount of additional time by which the Web session is extended; extending the time remaining before the timeout, based on said extension request, using said session object; and sending to said client updated remaining time information about said extended remaining time.

22. A program storage device readable by a machine, the program storage device storing a program of instructions executable by a machine to perform method steps comprising: acquiring, independently of any action by a user, via a network, the time remaining before a timeout on a Web session of an application server; starting an internal timer and updating and displaying the time remaining at each of a plurality of periodic timer update events; receiving an extension request event to extend the remaining time by an extended time period provided by the user by specifying an amount of additional time by which the Web session is extended in relation to the remaining time updated and displayed; and displaying updated remaining time received from said application server via said network in response to said extension request.

* * * * *